Nov. 13, 1956 W. C. WALKER 2,770,097
COOLING SYSTEMS FOR ENGINES THAT UTILIZE HEAT
Filed Feb. 14, 1952 4 Sheets-Sheet 4

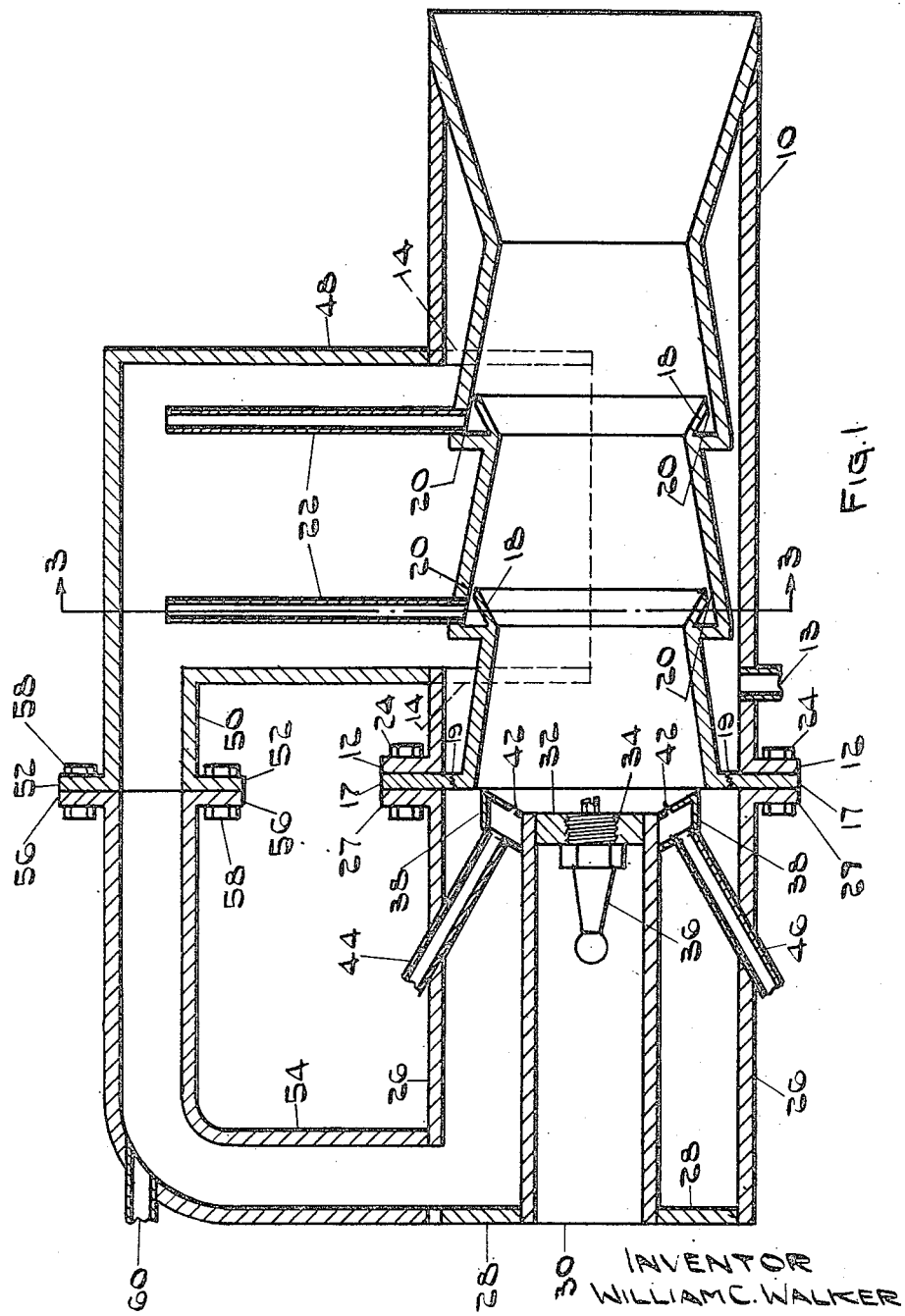

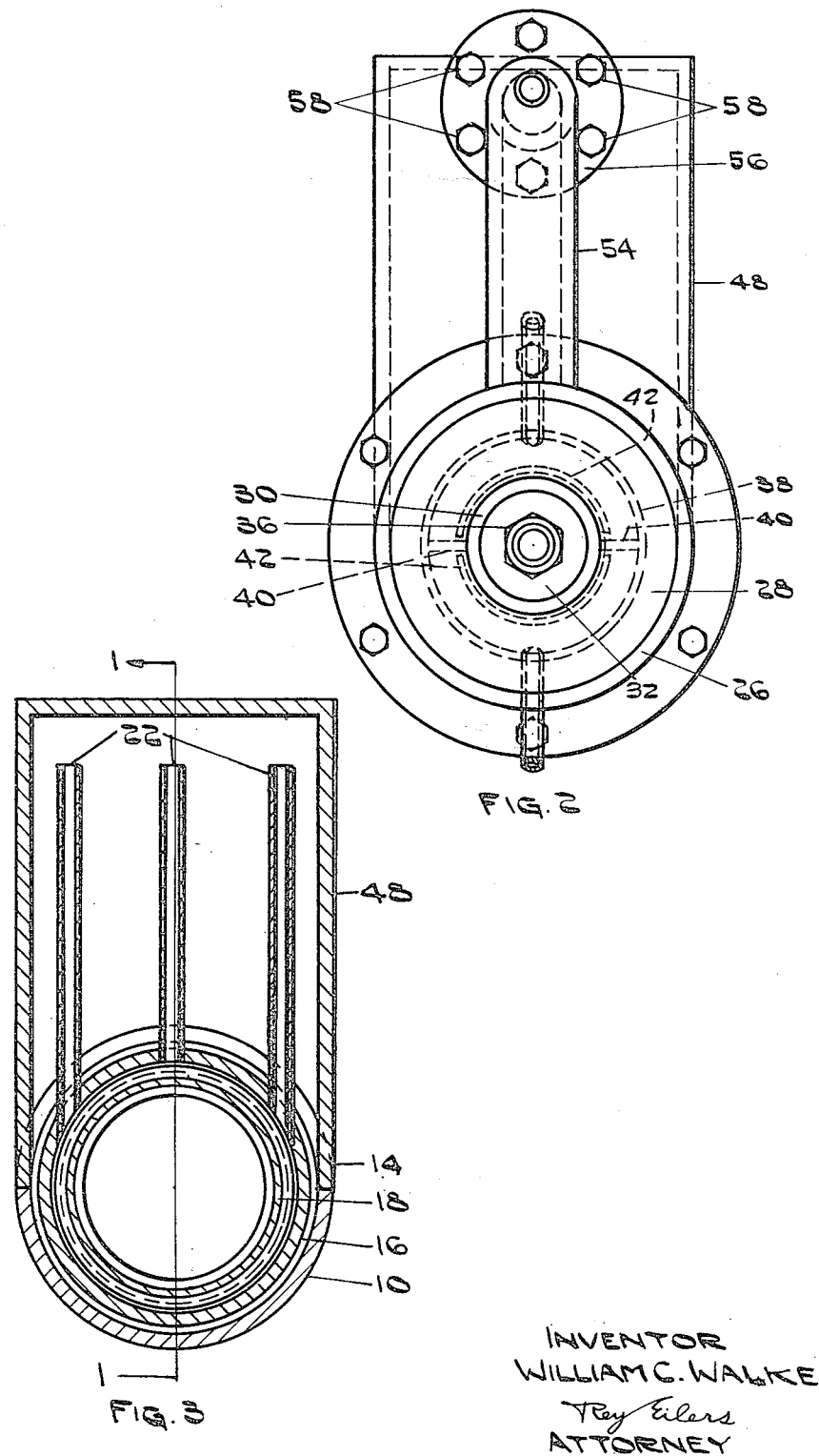

INVENTOR
WILLIAM C. WALKER
Rey Eilers
ATTORNEY

United States Patent Office 2,770,097
Patented Nov. 13, 1956

2,770,097

COOLING SYSTEMS FOR ENGINES THAT UTILIZE HEAT

William C. Walker, Granite City, Ill.

Application February 14, 1952, Serial No. 271,483

13 Claims. (Cl. 60—39.55)

This invention relates to improvements in engines that utilize heat. More particularly this invention relates to improvements in cooling systems for engines that utilize heat.

It is therefore an object of the present invention to provide an improved cooling system for engines that utilize heat.

Certain engines that utilize heat tend to develop extremely high temperatures in their combustion chambers and in their exhaust nozzles. Examples of such engines are rocket engines, jet engines, and gas turbines. In many instances the temperatures in the combustion chambers and exhaust nozzles of these engines are so high that the metal in the walls of the combustion chambers and exhaust nozzles will melt or even vaporize. Even in those instances where the metal, in those walls of the combustion chambers or exhaust nozzles, does not melt or vaporize, that metal can experience a material reduction in strength at the high temperature level and can become distorted. As a result, it has become necessary to provide cooling for the walls of the combustion chambers and exhaust nozzles of many engines that utilize heat. Such cooling systems must be very efficient and, where the engines are to be used in propelling craft through the air, they must be light in weight. The present invention provides such a cooling system, and it is therefore an object of the present invention to provide a cooling system for engines which utilize heat that is efficient and that is light in weight.

Some forms of engines that utilize heat have been provided with cooling systems; and those cooling systems customarily have a jacket around the combustion chamber and exhaust nozzle, and a coolant is forced through that jacket. In some instances the coolant is water and in other instances the coolant is either the fuel or the combustion-sustaining material to be admixed with the fuel. In either case, the fluid must be forced through the jacket at a relatively high velocity in order to assure effective cooling, and the extent of cooling effected in this manner is limited by hydraulic friction and by the rate of heat transfer from a metal surface to a moving liquid. It has been found that while these methods of cooling do assist in removing heat from the metal walls of the combustion chambers and the exhaust nozzles of engines that utilize heat, these methods of cooling are not as efficient as is desired. The present invention provides a more efficient cooling system for engines that utilize heat, and that system both absorbs heat from the walls of the combustion chamber and exhaust nozzle and shields those walls from direct contact with the hot gases in the engine. In this way, a very efficient cooling is effected. It is therefore an object of the present invention to provide a cooling system for heat engines that utilize fuels which burn at high temperatures, that absorbs heat from the walls of the engines and also protects those walls from direct contact with the hot gases in the engines.

The present invention provides a vaporization chamber which has as one wall thereof the wall of the combustion chamber and exhaust nozzle of the engine. That wall thus acts as a heat-transferring surface between the combustion chamber and exhaust nozzle and the vaporization chamber; and that wall will efficiently and quickly transfer heat to the liquid in the vaporization chamber. Thus there is a prompt and direct cooling of the wall of the combustion chamber and exhaust nozzle. This heat will vaporize the liquid in the vaporization chamber immediately adjacent the heat-transferring wall, and as the liquid vaporizes it will absorb its heat of vaporization from that wall. Since the heat of vaporization of water or comparable liquids is high, the vaporization process absorbs a very substantial amount of heat from the wall. The vapor is then conducted through suitable ducts to nozzles adjacent the inner surfaces of the wall of the combustion chamber and exhaust nozzle. This vapor is directed along the inner surface of that wall and will spread along that wall as a thin film. This thin film will tend to isolate the wall of the combustion chamber and exhaust nozzle from the hot exhaust gases within the combustion chamber and exhaust nozzle. In addition, it will tend to absorb further heat from the inner surfaces of that wall. From this it is apparent that the cooling system provided by the present invention provides an initial cooling of the wall of the combustion chamber and exhaust nozzle of an engine which utilizes heat by having a liquid in direct engagement with that wall to vaporize and absorb its heat of vaporization from that wall, that system provides a secondary cooling effect by passing the vapor along the inner surfaces of that wall from a series of spaced nozzles, and that system reduces the initial heating of that wall by the hot gases by isolating those gases from that wall by a thin film of vapor. These three effects coact together to provide an efficient cooling operation. It is therefore an object of the present invention to provide a cooling system for engines that utilize heat which holds a quantity of liquid in engagement with the outer surfaces of the combustion chamber and exhaust nozzle for the purposes of vaporizing that liquid and thereby absorbing its heat of vaporization from that chamber and nozzle, conducts that vapor to the inner surfaces of the combustion chamber and exhaust nozzle and directs that vapor along the surfaces of that combustion chamber and exhaust nozzle in the form of a thin film.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

In the drawing—

Fig. 1 is a cross sectional side view of an engine which utilizes heat and which is provided with a cooling system made in accordance with the principles and teachings of the present invention, and that section is taken along the plane indicated by the line 1—1 in Fig. 3.

Fig. 2 is an end elevational view of the engine shown in Fig. 1.

Figure 4:
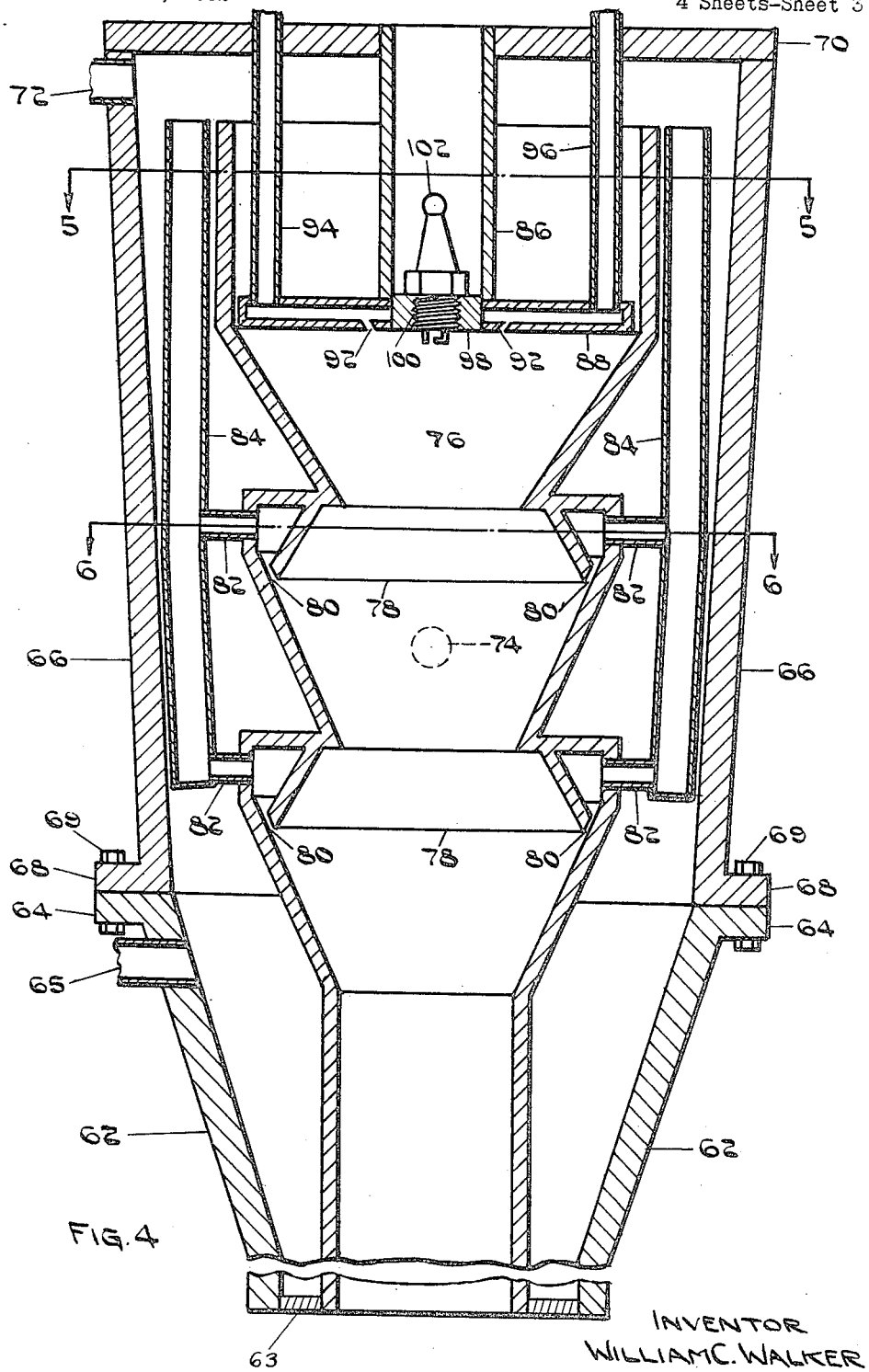
Figure 5:
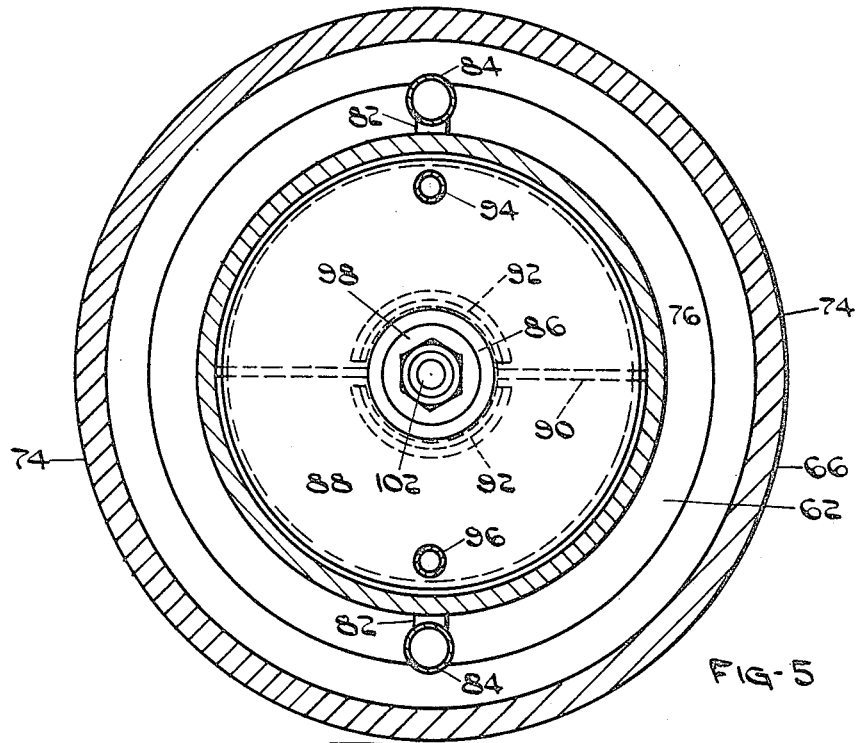
Figure 6:
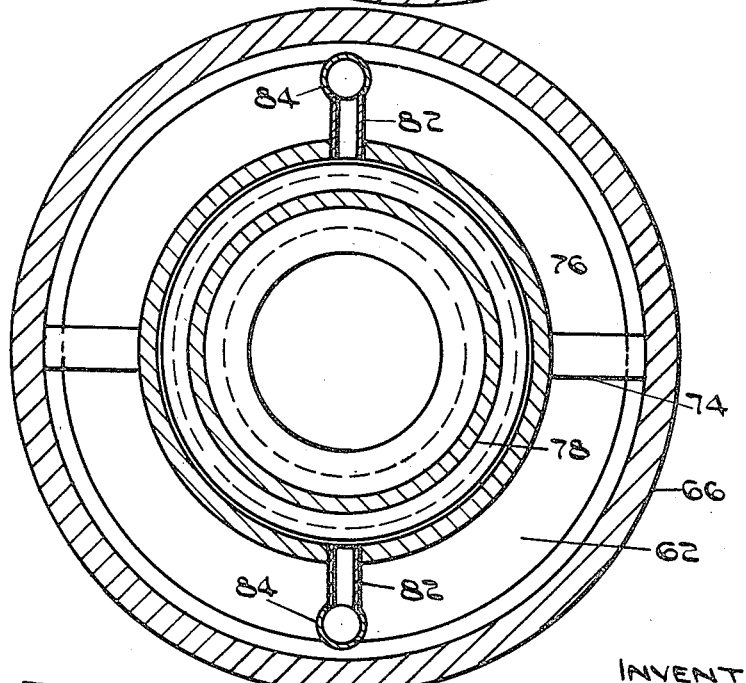

Fig. 3 is a cross sectional end view of the engine shown in Fig. 1, and it is taken along the plane indicated by the line 3—3 in Fig. 1, Fig. 4 is a cross sectional side view of another form of engine which utilizes heat and which is provided with a cooling system made in accordance with the principles and teachings of the present invention, Fig. 5 is a cross sectional plan view of the engine of Fig. 4, and it shows that engine rotated ninety degrees about its vertical axis, and it is taken along the plane indicated by the line 5—5 in Fig. 4, and Fig. 6 is a cross sectional plan view of the engine of Fig. 4, and it is taken along the plane indicated by the line 6—6 in Fig. 4, and that sectional view is rotated ninety degrees about the vertical axis of that engine.

Referring to the drawing in detail, Figs. 1–3 show an engine which is intended for horizontal positioning. The numeral 10 denotes a section of pipe which has a flange 12 at the left hand end thereof. The right hand end of the pipe 10 has a chamfer on the inner surface thereof. An inlet pipe 13 communicates with the bottom of the pipe 10, and that inlet will be connected to a suitable source of make-up liquid. The upper surface of the pipe has a cutaway portion 14 which is generally rectangular in plan view.

A combustion chamber 16 is secured to the pipe 10 at its right hand end; the end of the combination chamber being welded to the chamfered end of pipe 10. This combustion chamber consists of four truncated cones; and three of those cones have their large ends at the left and have their small ends at the right, while the fourth cone has its small end at the left and has its large end welded to the right hand end of the pipe 10. The small ends of the truncated cones are smaller than the large ends of adjacent cones. The small end of the truncated cone at the left end of the combustion chamber is integrally secured to the large end of the second cone by a radially extending wall, and the right end of the second cone is secured to the left end of the third cone by a radially extending wall. The right end of the third cone is integrally secured to the left end of the right hand cone, and the right hand cone serves as an exhaust nozzle for the engine. The combustion chamber can be made by casting it or by integrating it in a manner known to those skilled in the art of working metal. The combustion chamber 16 has a flange 17 at the left hand end thereof, and that flange is registrable with and securable to the flange 12 on the pipe 10. The confronting faces of the flanges 17 and 12 will be suitably machined to provide a liquid-tight joint therebetween. In assembling the combustion chamber with the pipe 10, the flange 17 must be separated from the combustion chamber 16 and then reassembled with that combustion chamber. Inter-fitting threads 19 on the flange 17 and the combustion chamber 16 permit the flange 17 to be separated from and then reassembled with the combustion chamber. The threads are so formed that they provide a liquid-tight joint between the flange 17 and the combustion chamber 16. After the flange 17 has been removed from the combustion chamber 16, and the combustion chamber has been inserted through the right hand end of the pipe 10, the flange will be reassembled with the combustion chamber 16 and will serve to center the left hand end of the combustion chamber 16 relative to the pipe 10. Once the combustion chamber 16 has been centered relative to the pipe 10, the right hand end of the pipe 10 and the combustion chamber can be welded together.

Two annular recesses of triangular configuration are formed at the inner surface of the combustion chamber 16 by the radially extending walls and the two center cones. Annular plates 18, which have the form of truncated cones and which have their small ends secured to the radially extending walls of the combustion chamber 16 and have their larger ends extending toward but terminating short of the inner surfaces of the two central cones, overlie and substantially close these annular recesses to define annular passages. The spacing between the large ends of the annular plates 18 and the inner surfaces of the two central cones defines two annular orifices. The large ends of the annular plates 18 are chamfered so those ends are parallel to the inner surfaces of the two central cones; thus annular orifices with parallel walls directed along the inner surfaces of the two central cones are provided. The annular passages are denoted by the numeral 20 and they extend around the inner surfaces of the combustion chamber 16.

Six pipes 22 are seated in openings in the combustion chamber 16 adjacent the annular passages 20, and they place those annular passages in communication with a vaporization chamber around the combustion chamber 16. The pipes 22 may be held in the openings in the combustion chamber 16 by threads or by welds. These pipes prevent liquid adjacent the combustion chamber 16 from entering that combustion chamber but will permit vapor to enter the annular passage 20 and then issue into the combustion chamber through the annular orifices.

The numeral 26 denotes a section of pipe of the same diameter as the pipe 10. This section of pipe has a flange 27 thereon that is held in assembled relation with the flanges 17 and 12 by the bolt and nut combination 29. The confronting faces of the flanges 17 and 27 are machined so the two flanges provide a liquid-tight joint therebetween. An annular closure 28 is provided for the left hand end of the pipe 26, and that closure can be threaded or welded to the left hand end of the pipe 26. A tube 30 is secured to the closure 28 by threads or by welds, and that tube extends inwardly of the pipe 26. The tube 30 has a closure 32 at its inner ends, and that closure has a threaded opening 34. This opening receives a spark plug 36. The tube 30 is larger in diameter than the spark plug and will permit air to pass in and out of that tube to cool the spark plug. A suitable lead, not shown, will be connected to the outer end of the spark plug 36.

A hollow chamber 38 of annular form is secured to and supported by the tube 30. This chamber is divided into two compartments by a partition 40, and each of the compartments has generally semi-circular outlets 42. The semi-circular outlets 42 have the ends thereof adjacent each other but spaced apart. One of the compartments will contain fuel and that fuel will issue through one of the semi-circular outlets 42. The other of the compartments will contain a combustion-sustaining medium and that medium will issue through the other of the outlets 42. The medium that will customarily be used will be oxygen but liquid air could also be used. The fuel will be introduced into the compartment of chamber 38 through the fuel line 44. This fuel line is secured at its right hand end to the compartment 38 and is supported intermediate its ends by the pipe 26. The joint between the fuel line 44 and the pipe 26 will be liquid tight. The combustion-sustaining medium will be conducted to the chamber 38 by a tube 46 which has the right hand end thereof secured to the chamber 38 and is supported intermediate its ends by the pipe 26. The joint between the pipe 46 and the pipe 26 will be liquid-tight.

A rectangular closure 48 has two cutaway portions of semi-cyclindrical configuration at its lower end, and that enclosure is seated in the cutaway portion of the pipe 10. Welds will extend along the joint between the pipe 10 and the enclosure 48 and will make that joint liquid-tight. The rectangular enclosure 48 will be welded to the pipe 10 after the combustion chamber 16 has been inserted within that pipe and after the pipes 22 have been secured to the combustion chamber 16. The enclosure 48 has a tubular projection 50 adjacent the upper end thereof, and that projection has a flange 52 thereon.

A tube 54 which has an internal diameter equal to that of the tubular projection 50 on enclosure 48 extends from that tubular projection to an opening at the left hand end of the pipe 26. The tube 54 has a flange 56, and that flange will abut and mate with the flange 52 on the projection 50 of enclosure 48. The confronting surfaces of flanges 52 and 56 will be machined so a liquid-tight joint can be maintained between those flanges. Nut and bolt combinations 58 will secure the flanges 52 and 56 in assembled relation. The right hand end of the tube 54 will be suitably welded to the pipe 26 adjacent the hole in the pipe 26. An opening 60 will be provided in the tube 54 adjacent the upper end of that tube.

In operating the engine of Figs. 1–3, liquid is placed in the vaporization chamber defined by the pipe 10, the flange 19, the combustion chamber 16, and the enclosure 48. The liquid must extend above the top of the combustion chamber 16 but should not extend more than a fraction of an inch thereabove. The opening 13 will serve as an inlet for make-up water, and a suitable float valve will be located in a supply duct which will maintain the liquid level in the vaporization chamber at the desired height. A pressure regulating device, not shown, will be connected to the opening 60 of tube 54 to regulate the pressure of the vapor in the vaporization chamber. Fuel will be introduced into the fuel line 44, and the combustion-sustaining medium will be introduced into the pipe 46. An arc will be drawn between the spaced terminals of the spark plug, and combustion will start in the combustion chamber. Some of the products of combustion may find their way into the annular passages 20 through the annular orifices between the plates 18 and the inner surfaces of the two center cones, and some of the products of combustion may find their way into the pipe 26 through the annular orifice between the periphery of chamber 38 and the left hand end of the left hand cone of the combustion chamber 16. However, as soon as the pressure in the vaporization chamber reaches the level of the pressure in the combustion chamber, further influx of products of combustion into the vaporization chamber will be halted. Most of the products of combustion will pass from the left to the right hand end of the combustion chamber 16 and issue therefrom. These products of combustion will engage the walls of the truncated cones successively and will heat those walls. That heat will be transferred through to the liquid in engagement with the outer surfaces of those walls, and as those walls get hot that liquid will begin to vaporize. That liquid will absorb its heat of vaporization from those walls and keep those walls from reaching objectionably high temperatures. The vapor will rise upwardly into the upper portions of the vaporization chamber and part of it will pass through the projections 50 into the tube 54 and through pipe 26 and the orifice adjacent the periphery of the chamber 38 into the combustion chamber. The rest of the vapor will pass through the ducts 22 into the annular passages 20 and be discharged from the annular orifices adjacent the right hand ends of the annular plates 18. The vapor issuing from the annular orifice adjacent the chamber 38 will extend along the inner surface of the left hand cone as a thin film, and the vapor extending from the two annular passages 20 will extend along the adjacent surfaces of the center cones as thin films. These thin films will absorb heat from the inner surfaces of the walls of the combustion chamber 16 and will also isolate the products of combustion from those walls. A three-fold effect is thus attained; first, an absorption of heat from the outer surfaces of the combustion chamber and exhaust nozzle, second, an absorption of heat from the inner surfaces of that combustion chamber and exhaust nozzle, and third, the reduced transfer of heat from the products of combustion to the combustion chamber and exhaust nozzle. As the liquid is vaporized, additional liquid will be pumped into the vaporization chamber through the opening 13.

While vapor is free to move into the pipe 26, liquid is kept out of that pipe by the flange 19 and by the vertically directed positioning of the enclosure 48. Similarly, while vapor can move freely into the passages 20, liquid cannot enter those passages because of the pipes 22 which extend to the upper, liquid-free portions of the vaporization chamber.

If desired, pressure-responsive valves could be set in the tube 54, and in the pipes 22. Such valves could be pre-set to maintain vapor under graduated pressures in the tube 54 and the pipes 22. For example, such valves would enable a vapor stream to issue from the left hand annular passage 20 at a greater or lesser pressure than the vapor will issue from either the right hand annular passage 20 or the annular orifice adjacent the chamber 28. If desired a graduation in pressures could be obtained from one end to the other of the combustion chamber.

Water will be a useful and desirable coolant because of its low cost. However, other liquids can be used, but those liquids should be inert and should not enhance combustion immediately adjacent the walls of the combustion chambers.

The volume and pressure of the combustion products will decrease as heat is transferred to the thin film of vapor adjacent the walls of the combustion chamber and to those walls; but those decreases will be compensated for by increases in the volume and pressure of the vapor to which the heat is transferred. The overall temperature of the combustion products will be reduced by this invention; and where those combustion products drive turbine blades, the "burning" of those blades will be minimized.

Figs. 4–6 disclose an engine which utilizes heat and which is intended to operate in a vertical position. That engine has a casing made in two parts. The lower part is denoted by numeral 62 and it has a conical upper end. An annular closure 63 is secured to the lower end of the lower part 62 of the casing. A flange 64 is secured to the upper end of the part 62 and an opening 65 for inlet of liquids is provided in the part 62 adjacent the flange 64. The upper part of the casing is conical and is denoted by the numeral 66. The upper part 66 of the casing has a flange 68 which is securable to the flange 64 of the lower part of the casing. The confronting faces of the flanges 64 and 68 are machined so they can provide a liquid-tight joint. The bolt and nut combinations 69 secure the flanges 64 and 68 in liquid-tight engagement. The casing has a closed upper end 70 and an opening 72 immediately below that closed upper end. The upper end 70 of the casing is made separate from the upper part of the casing during manufacture but is welded to that upper part 66 during the assembly of the engine so the upper part 70 and the upper end 70 of the casing are unitary in form.

Before the upper end 70 is welded to the upper part 66, a combustion chamber 76 is placed within the casing. This combustion chamber consists of a number of truncated cones and two tubular sections that are formed integrally as by casting or by welding the various parts together. The chamber 76 has a tubular portion at the top thereof and then has a truncated cone extending downwardly from that tubular portion. That cone has its upper end larger than its lower end. A radially extending wall projects outwardly from the lower end of the first cone and is secured to the upper end of a second truncated cone. The lower end of the second truncated cone is smaller than the upper end of that cone and that lower end is secured to a radially extending wall. This wall is secured to the upper end of a third truncated cone and the lower and smaller end of that truncated cone is secured to a tubular portion of small diameter. Annular plates 78 are secured to the radially extending walls to define annular passages which have annular orifices 80. Transversely extending pipes 82 communicate with the annular passages of the combustion chamber, and those pipes extend into vertically directed pipes 84. The pipes 82 may be threaded or welded to the combustion chamber 76 and the vertical pipes 84 are preferably welded to the pipes 82.

In assembling the combustion chamber with the casing, the pipes 82 and 84 are first assembled with the combustion chamber and thereafter the combustion chamber is inserted through the open upper end of the upper part 66 of the casing. The bottom of the tubular portion of the combustion chamber will be guided by the annular closure 63 for the lower part 62 of the casing. Struts 74 are provided on the exterior of the combustion chamber 76 and those struts will engage the inner wall of the upper part 66 of the casing. Those struts can be suitably welded to the upper part 66 of the casing to maintain the combustion chamber fixed relative to the upper part 66 of the casing. The closure 63 of the lower part 62 of the casing can have a welded connection to the combustion chamber 76 or can have a liquid-tight press fit.

A pipe 86 is secured to the upper end 70 of the casing, and that pipe has a chamber 88 of annular form secured to the lower end thereof. This chamber is divided into two compartments by the partition 90. A semi-circular orifice 92 is provided in the bottom of each of those compartments, and the ends of those orifices are adjacent each other but are not connected together. A fuel pipe 94 extends through the upper end 70 of the casing and communicates with the chamber 88. A pipe for a combustion-sustaining medium is denoted by the numeral 96 and it also extends through the upper end 70 of the casing and communicates with the chamber 88. The pipes 94 and 96 enter the two compartments of chamber 88 on opposite sides of the partition 90.

A closure 98 is provided for the pipe 86 and that closure has a threaded opening 100 therein. This opening receives a spark plug 102.

The closure 63, the lower part 62 of the casing, the combustion chamber 76, and the upper part 66 of the casing define a vaporization chamber. This vaporization chamber is closed at the upper end when the upper end 70 of the casing is welded in place. The pipes 86 will be dimensioned to place the periphery of the chamber 88 immediately adjacent the joint between the upper cone and the tubular combustion chamber 76.

Liquid will be maintained in the vaporization chamber up to the level of the upper end of the top truncated cone of the combustion chamber 76. Thus when fuel and a combustion-sustaining medium are ignited by an arc from the spark plug 102, the liquid will absorb heat from the walls of the combustion chamber and the exhaust nozzle which is a part of the bottom of that chamber. As indicated in connection with the operation of the engine disclosed in Figs. 1–3, the liquid will provide a triple cooling operation. Not only will the liquid absorb heat from the exterior of the combustion chamber 76 but it will pass in the form of vapor to the three annular orifices and will pass along the inner surfaces of the three truncated cones of the combustion chamber and absorb heat from those cones, and it will also tend to isolate those cones from the products of combustion in the chamber 76.

In each instance the vapor will tend to flow in the form of a thin film and act as an isolating barrier. The turbulence experienced in the combustion chambers of engines which utilizes heat will destroy that film but the film will tend constantly to reestablish itself. In this way, there will always be a tendency to establish and maintain the isolating film.

Whereas the drawing and accompanying description have shown and described two preferred embodiments of the present invention it should be apparent to those skilled in the art that various changes may be made in the form of the invention without affecting the scope thereof.

What I claim is:

1. In an engine that utilizes heat and that has a combustion chamber and a vaporization chamber, the improvement that comprises a hollow truncated cone having its large end at its left and having its small end at its right, a second hollow truncated cone having its large end at its left and having its small end at its right, the large end of said second cone being larger than the small end of the first said cone, an annular wall contiguous with the small end of the first said cone and with the large end of said second cone, said cones and said wall defining said combustion chamber, said wall and said second cone defining an annular recess, a third hollow truncated cone that has its small end at its left and that has its large end at its right, the small end of said third cone being adjacent the small end of the first said cone and the large end of said third cone extending toward but terminating short of the inner surface of said second cone, said third cone overlying said annular recess to define an annular passage with an annular outlet, the large end of said third cone having a chamber thereon so said large end of said third cone and said inner surface of said second cone provide parallel walls for said annular outlet, said first and second cones forming a part of the wall of said vaporization chamber and placing the said vaporization chamber in heat-transferring relation with said combustion chamber, and a duct extending from the upper part of said vaporization chamber to said annular passage.

2. In an engine that utilizes heat and that has a combustion chamber and a vaporization chamber, the improvement that comprises a hollow truncated cone having its large end at its left and having it small end at its right, a second hollow truncated cone having its large end at its left and having its small end at its right, the large end of said second cone being larger than the small end of the first said cone, an annular wall contiguous with the small end of the first said cone and with the large end of said second cone, said cones and said wall defining said combustion chamber, said wall and said second cone defining an annular recess, an annular wall overlying said annular recess to define an annular passage, an opening in said passage that can direct vapor along the inner surface of said second cone, said first and second cones forming a part of the wall of said vaporization chamber and placing the said vaporization chamber in heat-transferring relation with said combustion chamber, and a duct extending from the upper part of said vaporization chamber to said annular passage.

3. In an engine that utilizes heat and that has a combustion chamber and a vaporization chamber, the improvement that comprises a hollow truncated cone having its large end at its left and having its small end at its right, a second hollow truncated cone having its large end at its left and having its small end at its right, the large end of said second cone being larger than the small end of the first said cone, an annular wall contiguous with the small end of the first said cone and with the large end of said second cone, said cones and said wall defining said combustion chamber, said wall and said second cone defining an annular recess, an annular wall overlying said annular recess to define an annular passage, an opening in said passage that can direct vapor along the inner surface of said second cone, said first and second cones forming a part of the wall of said vaporization chamber and placing the said vaporization chamber in heat-transferring relation with said combustion chamber, a duct extending from the upper part of said vaporization chamber to said annular passage, and a nozzle at the left end of the first said cone, said nozzle directing fuel into said combustion chamber.

4. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporization chamber to admit liquid, said hot wall defining a cylindrical combustion chamber with an igniting area and an outlet spaced from said igniting area, an annular passage at the inner surface of said hot wall, a duct extending between said passage and the upper part of said vaporization chamber to conduct vapor from said vaporization chamber to said passage, and an opening in said passage that communicates with said combustion chamber and that directs a thin layer of vapor into said combustion chamber, said opening being in confronting relation with said outlet and being immediately adjacent the inner surface of said hot wall of said engine whereby vapors issuing from said opening will be directed toward said outlet as a thin layer of vapor overlying and protecting said inner surface of said hot wall of said engine.

5. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporation chamber to admit liquid, said hot wall defining a cylindrical combustion chamber with an igniting area and an outlet spaced from said igniting area, an annular passage at the inner surface of said hot wall, a duct extending between said passage and the upper part of said vaporization chamber to conduct vapor from said vaporization chamber to said passage, and an opening in said passage that communicates with said combustion chamber, said opening being narrow and elongated and being adjacent the inner surface of said hot wall of said engine to direct a thin film of vapor onto said inner surface of said hot wall.

6. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporization chamber to admit liquid, said hot wall defining a cylindrical combustion chamber with an igniting area and an outlet spaced from said igniting area, an annular passage at the inner surface of said hot wall, a duct extending between said passage and the upper part of said vaporization chamber to conduct vapor from said vaporization chamber to said passage, and an opening in said passage that communicates with said combustion chamber and that directs vapor along the inner surface of said hot wall of said engine to protect same.

7. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporization chamber to admit liquid, an opening in said hot wall that communicates with the inner surface of said hot wall, said opening being spaced from said vaporization chamber so liquid within said vaporization chamber can not flow through said opening and onto said inner surface of said hot wall, a duct extending between said opening and the upper part of said vaporization chamber to conduct vapor from said vaporization chamber to said opening and thus to said inner surface of said hot wall, said vaporization chamber being adapted to receive liquid that can respond to heat from said hot wall to vaporize and flow in the vapor state to said opening and onto said inner surface of said hot wall, said hot wall defining a combustion chamber which has an outlet for hot gases, said opening being in confronting relation to said outlet and being immediately adjacent the inner surface of said hot wall of said engine whereby vapors issuing from said opening are directed toward said outlet.

8. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporization chamber to admit liquid, an opening in said hot wall that communicates with the inner surface of said hot wall, said opening being spaced from said vaporization chamber so liquid within said vaporization chamber can not flow through said opening and onto said inner surface of said hot wall, a duct extending between said opening and the upper part of said vaporization chamber to conduct vapor from said vaporization chamber to said opening and thus to said inner surface of said hot wall, said vaporization chamber being adapted to receive liquid that can respond to heat from said hot wall to vaporize and flow in the vapor state to said opening and onto said inner surface of said hot wall, said hot wall defining a combustion chamber, said opening extending around the inner surface of said combustion chamber to direct a substantially continuous layer of vapor along said inner surface of said combustion chamber.

9. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporization chamber to admit liquid, an opening in said hot wall that communicates with the inner surface of said hot wall, said opening being spaced from said vaporization chamber so liquid within said vaporization chamber can not flow through said opening and onto said inner surface of said hot wall, a duct extending between said opening and the upper part of said vaporization chamber to conduct vapor from said vaporization chamber to said opening and thus to said inner surface of said hot wall, said vaporization chamber being adapted to receive liquid that can respond to heat from said hot wall to vaporize and flow in the vapor state to said opening and onto said inner surface of said hot wall, said opening being elongated and narrow to direct a thin film of vapor onto said inner surface of said hot wall.

10. In an engine which utilizes heat, the improvement that comprises a substantially continuous metal hot wall for said engine, a casing disposed outwardly of said hot wall of said engine to define a vaporization chamber between said hot wall of said engine and said casing, said vaporization chamber being in heat-transferring relation with the outer surface of said hot wall of said engine, said vaporization chamber being vapor-tight, an inlet in said vaporization chamber to admit liquid, an opening in said hot wall that communicates with the inner surface of said hot wall, said opening being spaced from said vaporization chamber so liquid within said vaporization chamber can not flow through said opening and onto said inner surface of said hot wall, a duct extending between said opening and the upper part of said vaporization chamber to conduct vapor from said vaporization chamber to said opening and thus to said inner surface of said hot wall, said vaporization chamber being adapted to receive liquid that can respond to heat from said hot wall to vaporize and flow in the vapor state to said opening and onto said inner surface of said hot wall.

11. In an engine that utilizes heat and that has a combustion chamber and a vaporization chamber, the improvement that comprises a hollow truncated cone having its large end at its left and having its small end at its right, a second hollow truncated cone having its large end at its left and having its small end at its right, the large end of said second cone being larger than the small end of the first said cone, an annular wall contiguous with the small end of the first said cone and with the large end of said second cone, said cones and said wall defining said combustion chamber, said wall and said second cone defining an annular recess, an annular wall overlying said annular recess to define an annular passage, an opening in said passage that can direct vapor along the inner surface of said second cone, said first and second cones forming a part of the wall of said vaporization chamber and placing the said vaporization chamber in heat-transferring relation with said combustion chamber, a duct extending from the upper part of said vaporization chamber to said annular passage, and a nozzle at the left end of the first said cone, said nozzle directing fuel into said combustion chamber, said nozzle having a circular periphery that coacts with the left end of the first said cone to define an annular opening, said annular opening being connected to the upper part of said vaporization chamber by a second duct.

12. An engine that utilizes heat and that comprises a substantially continuous metal hot wall which defines a heating chamber with an open end, a nozzle that is adjacent said open end of said heating chamber but has the periphery thereof spaced from said open end of said heating chamber to define an opening, a casing that is disposed outwardly of said hot wall to define a chamber, a vaporizable liquid in the chamber in engagement with said hot wall, said chamber having an upper vapor collecting region, said liquid responding to heat absorbed by said hot wall from the heat in said heating chamber to vaporize and thereby absorb heat from said hot wall, means for holding said vaporizable liquid away from said opening, and a duct extending from said upper region to said opening to conduct vapor from said upper region to said opening for introduction into said heating chamber adjacent the inner periphery of said heating chamber, whereby said vapor forms a sheath in contact with the inner wall of said heating chamber.

13. An engine that utilizes heat and that comprises a substantially continuous metal hot wall which defines a chamber with an open end, a nozzle that is adjacent said open end of said chamber but has the periphery thereof spaced from the inner periphery of said open end of said chamber to define an opening, a casing that is disposed outwardly of said hot wall to define a vaporization chamber between said casing and said hot wall, said vaporization chamber being in heat-transferring relation with the first said chamber through said hot wall, and a duct extending from the upper part of said vaporization chamber to a point in the rear of said nozzle, said nozzle constituting a separator between the first said chamber and vapor from said duct while permitting vapor to pass through said opening into said chamber.

References Cited in the file of this patent

UNITED STATES PATENTS

| | | |
|---|---|---|
| 2,016,921 | Goddard | Oct. 8, 1935 |
| 2,168,313 | Bichowsky | Aug. 8, 1939 |
| 2,359,108 | Hoskins | Sept. 26, 1944 |
| 2,523,656 | Goddard | Sept. 26, 1950 |
| 2,563,028 | Goddard | Aug. 7, 1951 |
| 2,636,345 | Zoller | Apr. 28, 1953 |

FOREIGN PATENTS

| | | |
|---|---|---|
| 140,516 | Great Britain | Mar. 23, 1920 |